(12) United States Patent
Dean et al.

(10) Patent No.: US 8,266,134 B1
(45) Date of Patent: *Sep. 11, 2012

(54) DISTRIBUTED CRAWLING OF HYPERLINKED DOCUMENTS

(75) Inventors: Jeffrey A. Dean, Menlo Park, CA (US); Craig Silverstein, Stanford, CA (US); Benedict Gomes, Berkeley, CA (US); Sanjay Ghemawat, Mountain View, CA (US)

(73) Assignee: Google Inc., Mountain View, CA (US)

( * ) Notice: Subject to any disclaimer, the term of this patent is extended or adjusted under 35 U.S.C. 154(b) by 1057 days.

This patent is subject to a terminal disclaimer.

(21) Appl. No.: 11/923,240

(22) Filed: Oct. 24, 2007

Related U.S. Application Data

(63) Continuation of application No. 09/638,082, filed on Aug. 14, 2000, now Pat. No. 7,305,610.

(60) Provisional application No. 60/195,581, filed on Apr. 6, 2000.

(51) Int. Cl.
*G06F 17/30* (2006.01)
(52) U.S. Cl. ...................................... 707/709
(58) Field of Classification Search ........................ None
See application file for complete search history.

(56) References Cited

U.S. PATENT DOCUMENTS

| | | | |
|---|---|---|---|
| 5,748,954 A * | 5/1998 | Mauldin ............................... 1/1 |
| 5,974,455 A * | 10/1999 | Monier ......................... 709/223 |
| 6,032,196 A | 2/2000 | Monier |
| 6,182,085 B1 | 1/2001 | Eichstaedt et al. |
| 6,263,364 B1 | 7/2001 | Najork et al. |
| 6,321,265 B1 * | 11/2001 | Najork et al. .................. 709/224 |
| 6,351,755 B1 | 2/2002 | Najork et al. |
| 6,374,260 B1 | 4/2002 | Hoffert et al. |
| 6,377,984 B1 | 4/2002 | Najork et al. |
| 6,418,453 B1 | 7/2002 | Kraft et al. |
| 6,424,966 B1 | 7/2002 | Meyerzon et al. |
| 6,453,419 B1 * | 9/2002 | Flint et al. .......................... 726/3 |
| 6,487,555 B1 * | 11/2002 | Bharat et al. ........................... 1/1 |
| 7,451,388 B1 * | 11/2008 | Henzinger et al. ............ 715/208 |
| 2005/0165778 A1 | 7/2005 | Obata et al. |

OTHER PUBLICATIONS

J. Dean et al., co-pending U.S. Appl. No. 09/638,082, filed Aug. 14, 2000, "Distributed Crawling of Hyperlinded Documents".

* cited by examiner

*Primary Examiner* — Neveen Abel-Jalil
*Assistant Examiner* — Kevin L Young
(74) *Attorney, Agent, or Firm* — Harrity & Harrity, LLP

(57) ABSTRACT

Techniques for crawling hyperlinked documents are provided. Hyperlinked documents to be crawled are grouped by host and the host to be crawled next is selected according to a stall time of the host. The stall time can indicate the earliest time that the host should be crawled and the stall times can be a predetermined amount of time, vary by host and be adjusted according to actual retrieval times from the host.

17 Claims, 7 Drawing Sheets

DISTRIBUTED CRAWLING OF HYPERLINKED DOCUMENTS

This application is a continuation of U.S. patent application Ser. No. 09/638,082, filed Aug. 14, 2000, which claims the benefit of U.S. Provisional Application No. 60/195,581, filed Apr. 6, 2000, which are both incorporated herein by reference.

BACKGROUND OF THE INVENTION

The present invention relates to crawling (or traversing) of hyperlinked documents. More specifically, the invention relates to techniques for the distributed crawling of hyperlinked documents that can perform rate limiting of hosts and adapt to actual retrieval times of the hosts.

The World Wide Web (or "Web") contains a vast amount of information in the form of hyperlinked documents (e.g., web pages). One of the reasons for the virtually explosive growth in the number of hyperlinked documents on the Web is that just about anyone can upload hyperlinked documents, which can include links to other hyperlinked documents. Although there is no doubt that there is a vast amount of useful information on the Web, the unstructured nature of the Web can make it difficult to find the information that is desired.

Search engines allow users to enter queries (e.g., key words) that describe the information users are seeking. The search engines then scan the Web for hyperlinked documents that best satisfy the query. With literally millions of hyperlinked documents on the Web, web crawlers are typically utilized to scan, index and store information regarding hyperlinked documents on the Web so that the search engines can execute queries more efficiently.

As the size of the Web continues to increase, it becomes increasingly more desirable to have innovative techniques for efficiently crawling the Web. Additionally, it would be beneficial to have web crawling techniques that are efficient yet do not impose unnecessary burdens on hosts on the Web.

SUMMARY OF THE INVENTION

The present invention provides innovative techniques for crawling of hyperlinked documents. In general, the hyperlinked documents are grouped by host and the host to crawl next is selected according to a stall time of the host, such as the earliest time in which a hyperlinked document from the host should be crawled. Additionally, a single link (e.g., uniform resource locator or URL) server can be utilized to interface with multiple link managers that provide links to hyperlinked documents to be crawled to the link server. The distributed nature of some embodiments of the invention can efficiently crawl hyperlinked documents while ensuring that unnecessary burdens are not placed on the hosts. Hosts can be identified by human-readable names, such as www.ibm.com, or they can be identified by all or part of the IP address of the host. Some specific embodiments of the invention are described below.

In one embodiment, the invention provides a computer implemented method of crawling hyperlinked documents. Links to hyperlinked documents to be crawled are received and the links are grouped by host. The host to crawl next is selected according to a stall time of the host. Once the host to crawl next is selected, a hyperlinked document from the selected host is crawled. In some embodiments, the hosts are grouped according to the number of hyperlinked documents to be crawled at each host.

In another embodiment, the invention provides a computer implemented method of crawling hyperlinked documents. Links to hyperlinked documents to be crawled are received and the links are grouped by host. The host to crawl next is selected according to a stall time of the host and a hyperlinked document from the selected host is crawled. The retrieval time for retrieving for the hyperlinked document from the selected host is determined and subsequent stall times for the selected host are adjusted according to the retrieval time. Thus, actual retrieval times can be utilized to adjust the stall times for the hosts.

In another embodiment, the invention provides a computer implemented method of crawling hyperlinked documents. Links to hyperlinked documents to be crawled are stored and when it is determined that more links are desired, requests are sent to multiple link managers for more links. Additional links are received from the link managers and the host to crawl next is selected according to the stall time of the host. Once the host to crawl next is selected, a hyperlinked document from the selected host is crawled.

Other features and advantages of the invention will become readily apparent upon review of the following description and association with the accompanying drawings, where the same or similar structures are designated with the same reference numerals.

DETAILED DESCRIPTION OF PREFERRED EMBODIMENTS

In the description that follows, the present invention will be described in reference to embodiments that crawl hyperlinked documents (e.g., web pages) on the Web. More specifically, the embodiments will be described in reference to crawling hyperlinked documents so that a search engine can more efficiently execute a user query. However, embodiments of the invention are not limited to any particular environment, application or specific implementation. For example, the embodiments described below can be advantageously applied to crawling hyperlinked documents on a local intranet for a number of diverse uses, such as cataloging hyperlinked documents at a university. Therefore, the description of the embodiments that follows is for purposes of illustration and not limitation.

Figure 1:
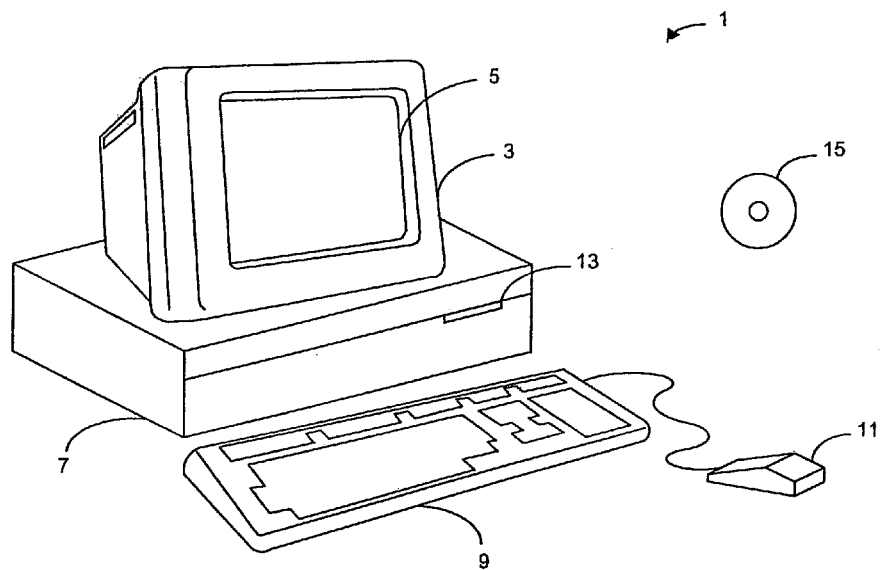
FIG. 1 illustrates an example of a computer system that can be utilized to execute the software of an embodiment of the invention.

FIG. 1 illustrates an example of a computer system that can be used to execute the software of an embodiment of the invention. FIG. 1 shows a computer system 1 that includes a display 3, screen 5, cabinet 7, keyboard 9, and mouse 11. Mouse 11 can have one or more buttons for interacting with a graphical user interface. Cabinet 7 houses a CD-ROM drive 13, system memory and a hard drive (see FIG. 2) which can be utilized to store and retrieve software programs incorporating computer code that implements the invention, data for use with the invention, and the like. Although CD-ROM 15 is shown as an exemplary computer readable storage medium, other computer readable storage media including floppy disk, tape, flash memory, system memory, and hard drive can be utilized. Additionally, a data signal embodied in a carrier wave (e.g., in a network including the Internet) can be the computer readable storage medium.

Figure 2:
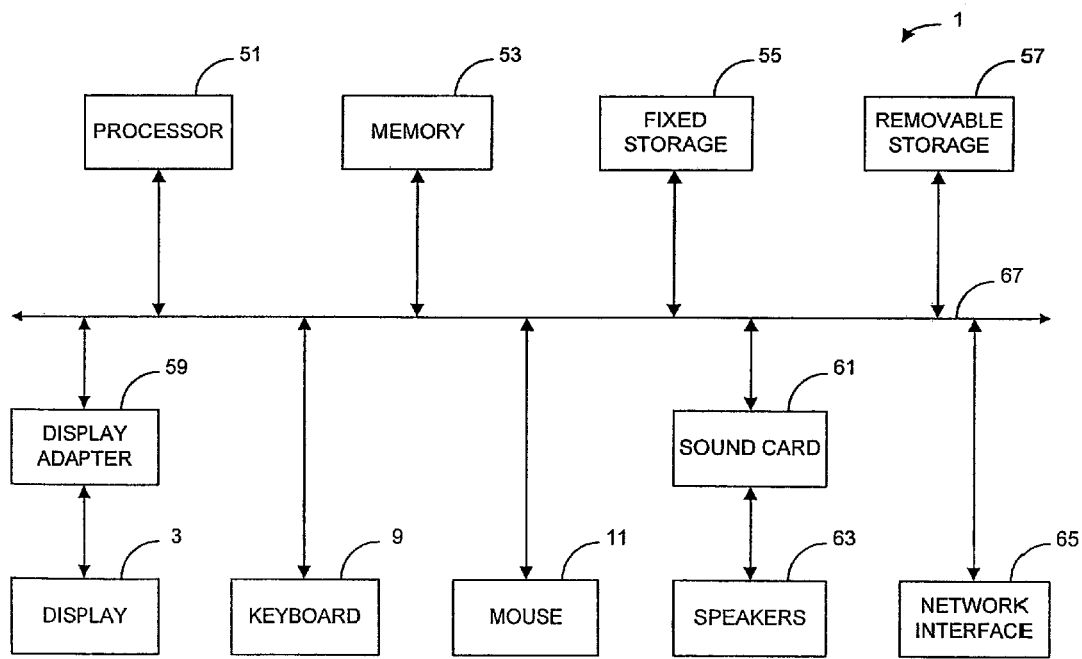
FIG. 2 illustrates a system block diagram of the computer system of FIG. 1.

FIG. 2 shows a system block diagram of computer system 1 used to execute the software of an embodiment of the invention. As in FIG. 1, computer system 1 includes monitor 3 and keyboard 9, and mouse 11. Computer system 1 further includes subsystems such as a central processor 51, system memory 53, fixed storage 55 (e.g., hard drive), removable storage 57 (e.g., CD-ROM drive), display adapter 59, sound card 61, speakers 63, and network interface 65. Other computer systems suitable for use with the invention can include additional or fewer subsystems. For example, another computer system could include more than one processor 51 (i.e., a multi-processor system) or a cache memory.

The system bus architecture of computer system 1 is represented by arrows 67. However, these arrows are illustrative of any interconnection scheme serving to link the subsystems. For example, a local bus could be utilized to connect the central processor to the system memory and display adapter. Computer system 1 shown in FIG. 2 is but an example of a computer system suitable for use with the invention. Other computer architectures having different configurations of subsystems can also be utilized.

Figure 3:
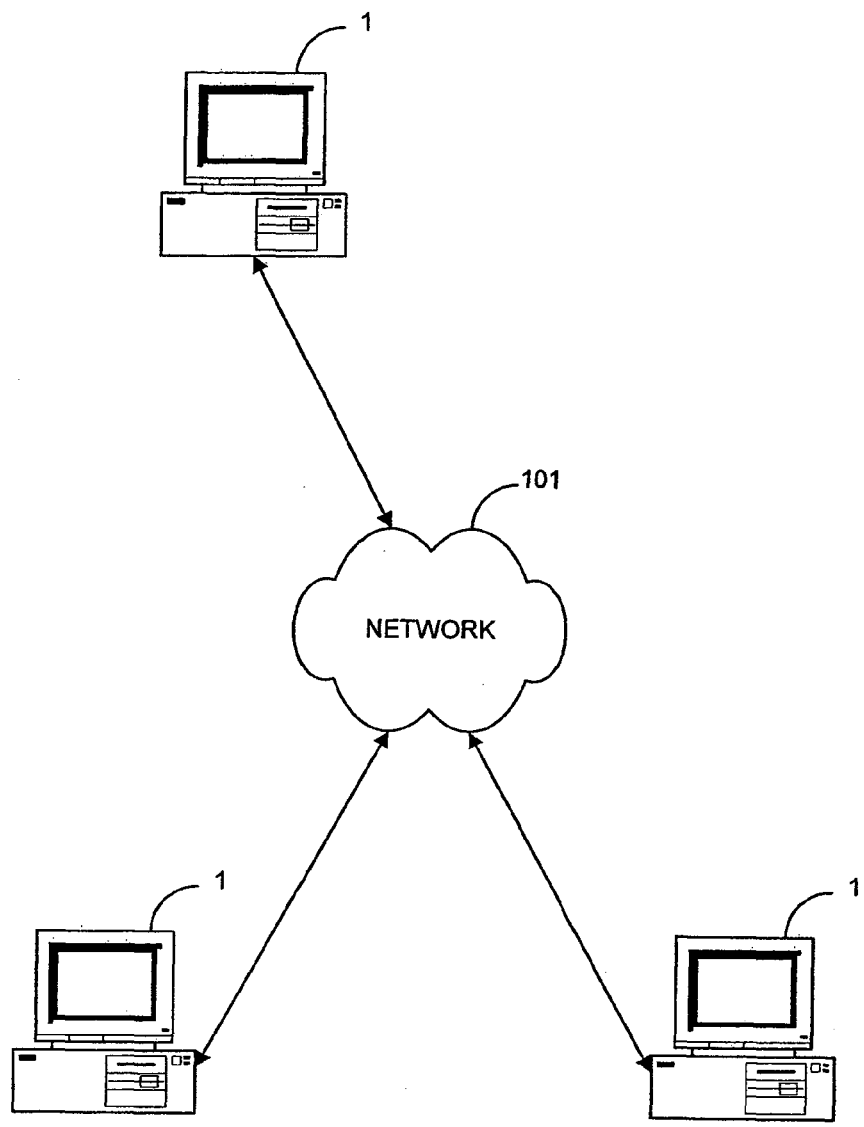
FIG. 3 illustrates a network of multiple computer systems including wide area networks and local area networks.

FIG. 3 shows a network of multiple computer systems. A network 101 provides communication between multiple computer systems 1. In a wide area network such as the Internet, some of the computer systems are servers (or hosts) and provide access to resources or services to client computer systems on the network. With respect to web pages, there are multiple server computer systems that store the web pages that make up the Web. The web pages typically include links in the form of uniform resource locators (URLs) that are a link to another web page, whether it is on the same server or a different one.

As described above, the Web is a distributed network of web pages. Networks of hyperlinked documents can also be present in local area networks (e.g., intranets). The operation of these intranets is very similar to the Internet except that it is not uncommon for all or a majority of the hyperlinked documents of an intranet to be stored on a single server computer system.

Network 101 is also representative of a network of computer systems that can be utilized to crawl hyperlinked documents on the Web. Due to the high number of hyperlinked documents currently on the Web, it can be beneficial to utilize a distributed network of web crawlers (and other processes). For example, each computer system 1 can be executing one or more web crawler that traverses hyperlinked documents and saves information regarding the traversed hyperlinked documents on the computer system. Further details of an embodiment of the invention will be described in more detail in reference to FIG. 4.

Crawling systems typically maintain a list of uncrawled links, with each link being assigned a priority for being crawled. The priority for each link can be assigned in a variety of ways. Most all crawling systems have a function that returns the next link that should be crawled. Although this function could always choose the uncrawled link with the highest priority, this technique does not limit the rate at which each host is crawled. For example, if the next 100 highest priority uncrawled links are all from the same host, the technique of always crawling the link with the highest priority will likely have the effect of placing an undue strain on this host.

Figure 4:
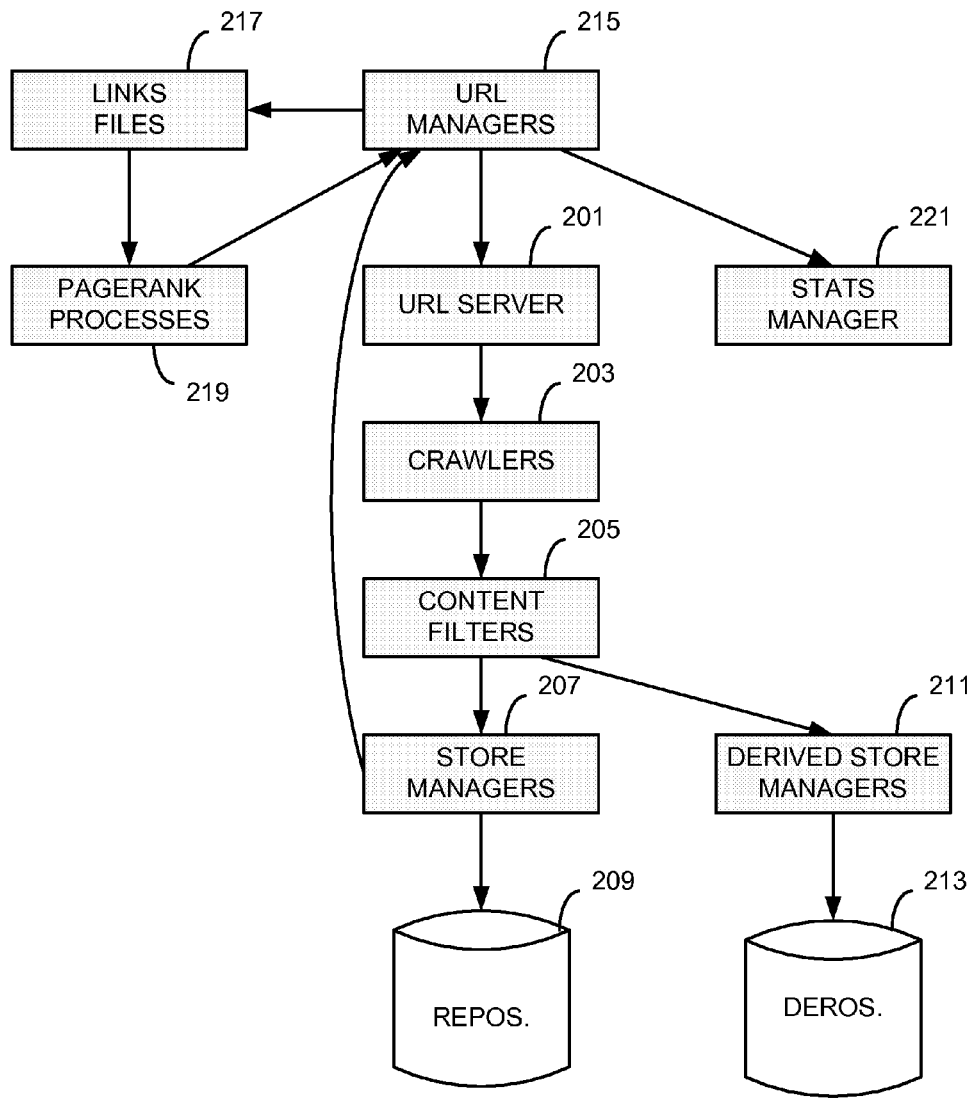
FIG. 4 shows a block diagram of one embodiment of a distributed web crawling system.

FIG. 4 shows a block diagram of a distributed system that crawls hyperlinked documents and can provide rate limiting for hosts. A link (e.g., URL) server 201 determines which links should be crawled next. Link server 201 maintains a pool of uncrawled links and groups the links by the host on which each link resides. Accordingly, link server 201 attempts to ensure that each particular host is not crawled too frequently. More details about how the link server can group the links will be discussed in reference to FIG. 5.

Crawlers 203 are responsible for retrieving hyperlinked documents from the servers. Many servers have a defined protocol for crawlers stored in a "robots.txt" file so crawlers 203 are also responsible for adhering to the specified protocol. For example, the robots.txt protocol can specify that certain links should not be crawled for any number of reasons. When a crawler needs one or more links to crawl, the crawler requests one or more links from link server 201. Once the contents at a link are retrieved the crawler sends the contents to one of many content filters 205.

Content filters 205 receive the contents from the link that was crawled by a crawler and are responsible for extracting any new links contained within the hyperlinked document. Additionally, content filters 205 can process the contents of the hyperlinked document according to the type of the file, to extract any text that should be indexed. For example, with an PDF file, the file can be converted to text for indexing.

For some file types (e.g., HTML pages, postscript files and PDF files), the canonical version of the file as it was extracted from the Web can be stored by store managers 207 in a (or multiple) repository 209. For some file types (e.g., MP3 files) the only version of the file that may be saved is a derived file in which information (such as text for indexing) has been extracted and stored by derived store managers 211 in a (or multiple) derository 213. For example, with MP3 files, the textual track information may be extracted and saved in the derository 213 without storing the original audio MP3 file in repository 209. For a given file type, a content filter may decide to store information in repository 209, derository 213 or both based on, the type of the file. In one embodiment, if the content filter decides to save information in both repository 209 and derository 213, the information will be sent to derository 213 first and after an acknowledgement is received, the information will be sent to repository 209.

Content filters 205 can also be responsible for performing any compression that is desired. The output of the content filters can be the URL, the set of extracted URLs contained within the file, the text of the file, the text of the filtered file, or non-text information. Typically, there may be different filter processes and systems for different types of content to ensure that the entire crawling process is not slowed down significantly for a particular type of content. Additionally, a special filter process may be utilized for the "normal" filtering of HTML documents so that these types of files can bypass other more exotic and slow-to-filter content types in the filtering stage. The content filters can additionally ignore any links that are extracted that match one of the URL patterns in a bad links file that contains a list of bad URLs.

Returning to store managers 207, each store manager can be responsible for writing information to a single repository so that there are many store managers and hence many repositories. Each store manager is responsible for taking the output of the content filters and appending this information to the appropriate repository.

In some embodiments, each link that is stored on the system is classified into one of several states. A state "not crawled" indicates that the link has been discovered or identified but has not yet been successfully crawled. The state "in flight" indicates that crawling has been requested for this link but the link has not yet been crawled to completion. When the crawling has been requested for a link but a significant amount of time has passed and the link has yet to be crawled (e.g., time is greater a threshold), the link status decays from "in flight" to "in flight+long time" indicating that a long time has passed and it may be beneficial to consider reissuing the crawl request.

A link that has been successfully crawled is given the state "crawled." If a link was not crawled due to a robots.txt rule, then the link is given the state "robots." If a link is attempted to be crawled but the server was unreachable then the link is given the state "unreachable," which can be retried at a later time, if desired. A link that has a state "server error" indicates that crawling the link was attempted but the server returned an error for this link (e.g., page not found). The link can be retried at a later time, if desired, however retrying the link is less likely to matter for this state than it did for the "unreachable" state.

Link managers 215 receive links, in the form of a link fingerprint, to be crawled from store managers 207. Additionally, link managers 215 are responsible for keeping track of the status (the states described above) of each link in the system, for maintaining link files 217 and for providing link server 201 with lists of high priority links to crawl. Because of the numerous links on the Web (and their associated information), there are typically many link managers that are distributed across many computer systems, with each link manager responsible for a portion of the link fingerprint space. In one embodiment, ten bytes of information are stored for each link. Eight bytes specify the link fingerprint and the remaining two bytes include three bits for the link state, 12 bits for the priority (or rank) of the link and one bit for a try count. A hash table is utilized to select the link manager for each link by hashing the link.

The priority of a link indicates the relative importance of the link. Thus, a high priority indicates that it would be desirable to crawl this link before a link with a low priority. In a preferred embodiment, the priority of the links is a ranking (also called PageRank) as described in application Ser. No. 09/004,827, filed Jan. 9, 1998, which is hereby incorporated by reference.

When link managers 215 receive links to be crawled, the link managers verify that the links do not match any of the link patterns in the bad links file. As described above, this process can also be preformed by content filters 205, however, it may be beneficial to perform the check again since the bad links file may have been modified after the link was extracted. When a link manager sends high priority links to link server 201, the status of these links is changed from "not crawled" to "in flight," which is accomplished by changing the three bits for the link representing the state.

As indicated in FIG. 4, there may be PageRank processes 219 that retrieve links from links files 217 and provides the links with a priority or rank. Links files 217 can store the structure of the Web for generating a priority. In some embodiments, a PageRank master (not shown) coordinates PageRank processes 219 and each PageRank process calculates priorities for a portion of the link space.

Before describing in detail the interaction of link managers 215 and link server 201, the functions of a stats manager 221 will be described. Stats manager 221 can be utilized in some embodiments to maintain statistics about the crawling process. For example, each link manager 215 can send a link and a status update message whenever a link update is received or at any other time. Some statistics that may be useful may be the total number of links in each state, the total number of links in each state for each host, the set of links that were crawled recently with optionally their priority, the set of links that are known for a particular host along with their state, and the like.

Figure 5:
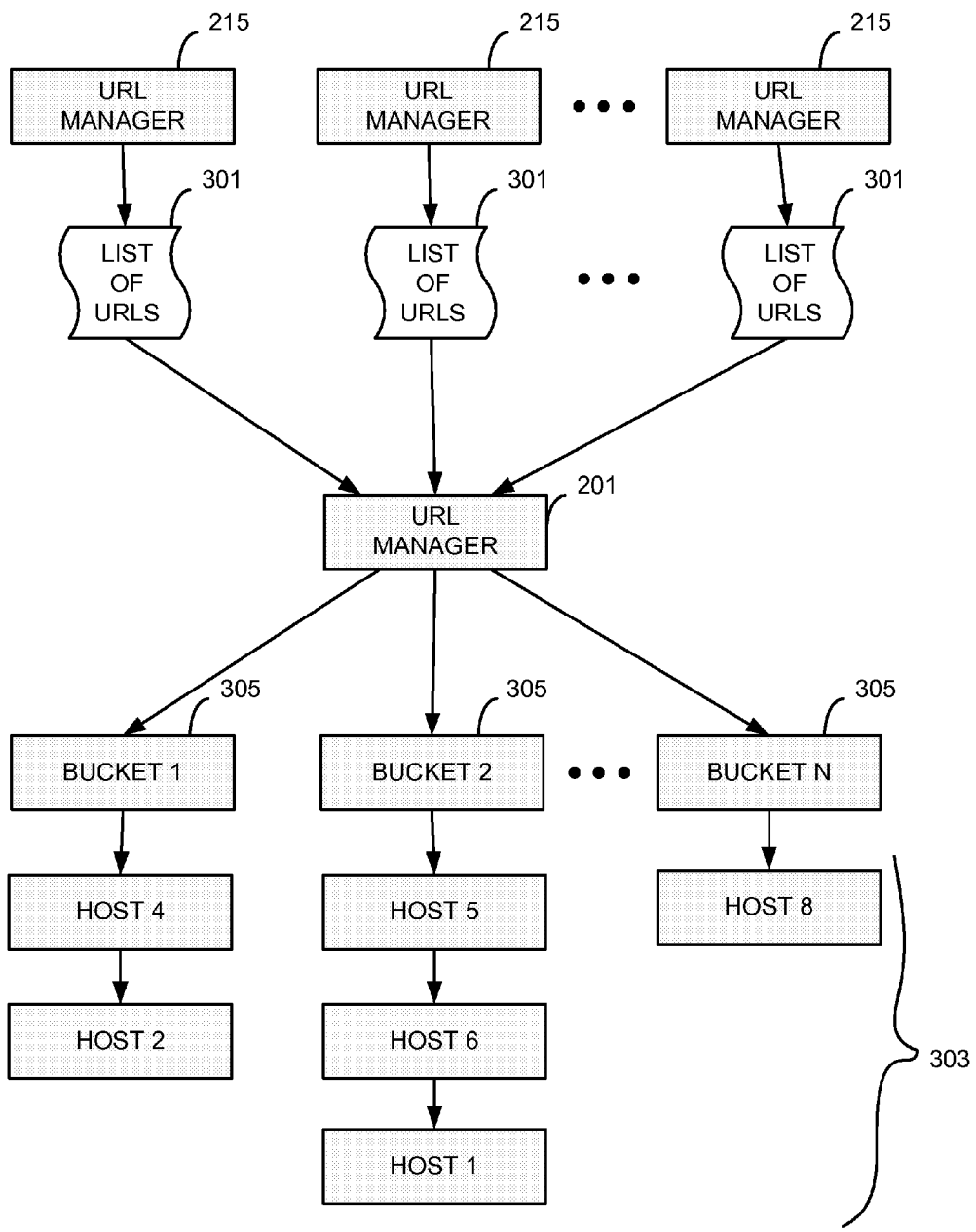
FIG. 5 shows an example of a block diagram of a single link server receiving links from multiple link managers and storing the links in buckets grouped by host.

As mentioned previously, it would be desirable to ensure that the hosts are not crawled too quickly. FIG. 5 shows a block diagram of how the link managers can pass lists of links to link server 201 and the link server can monitor the loads on each host. Periodically, link server 201 will require additional links to crawl. Recall that crawlers 203 will periodically request new batches of links (e.g., 500 at a time) to crawl from link server 201. As link server 201 doles out links to crawlers 203, the set of high priority links that the link server stores can run low (e.g., less than a threshold) and the link server can request more high priority links from link managers 215.

In one embodiment, when link server 201 needs more links to be crawled, the link server requests a predetermined number (e.g., 100,000) of links from each link manager 215. The link managers respond with a list of links 301 that include the highest priority links stored by the link manager. Link server 201 then incorporates the new links to be crawled from the lists of URLs 301 into the links to be crawled that the link server already has stored. Initially, the links are grouped according to the host that stores the link. Thus, the links are stored according to hosts 303, where each different host is shown with a different numeral. Hosts 303 are grouped into buckets 305. Buckets 305 are shown with numerals 1, 2, . . . n, which indicates that each host in the respective bucket has that number of uncrawled links. For example, bucket 2 group's hosts that have two uncrawled links.

In order to accomplish rate limiting of hosts, each host has an associated stall time, which is the earliest time at which another link from this host should be crawled or released to a crawler. The amount of stall time that is utilized per host can vary by host, allowing special cases for high throughput hosts (e.g., AOL). Additionally, the hosts within each bucket are sorted according to the earliest stall time so that an entire bucket can be skipped if it is determined that the first host in the bucket has a stall time indicating that the host is not ready to be crawled.

In one embodiment, each host has an associated load factor and estimated (or actual) retrieval time. A load factor of 0.1 (or 10%) indicates that it would be desirable to limit connections to this host to 10% of the time. The estimated retrieval time is an estimate of how long it typically takes to retrieve a web page. Therefore, if a host has a load factor of 0.1 and an estimated retrieval time of 3 seconds, the host can be crawled once every 30 seconds. In order to accomplish this, the stall time can be set to 30 seconds past the current time. Other embodiments can be envisioned and utilized without departing from the spirit and scope of the invention. A load factor larger than one indicates that the crawl system is willing to have multiple simultaneous connections to the server at all times.

When link server 201 wants to identify the next link to crawl, the link server starts at the highest numbered bucket and goes downwards until a bucket is found that includes a host that has a stall time that is before the current time. Once this host is found, a link is selected from the host, made ready to be passed to a crawler 203 and the link is removed from the hosts set of uncrawled links. Additionally, the host stall time is updated or reset to indicate when is the earliest time that another link from the host should be crawled and the host is moved from its current bucket to the bucket that includes hosts with one less uncrawled link. For example, Host 5 in Bucket 2 of FIG. 5 would be moved to Bucket 1 if Host 5 is crawled. If the hosts in each bucket are sorted according to stall times, the host will be inserted in the appropriate order.

Figure 6:
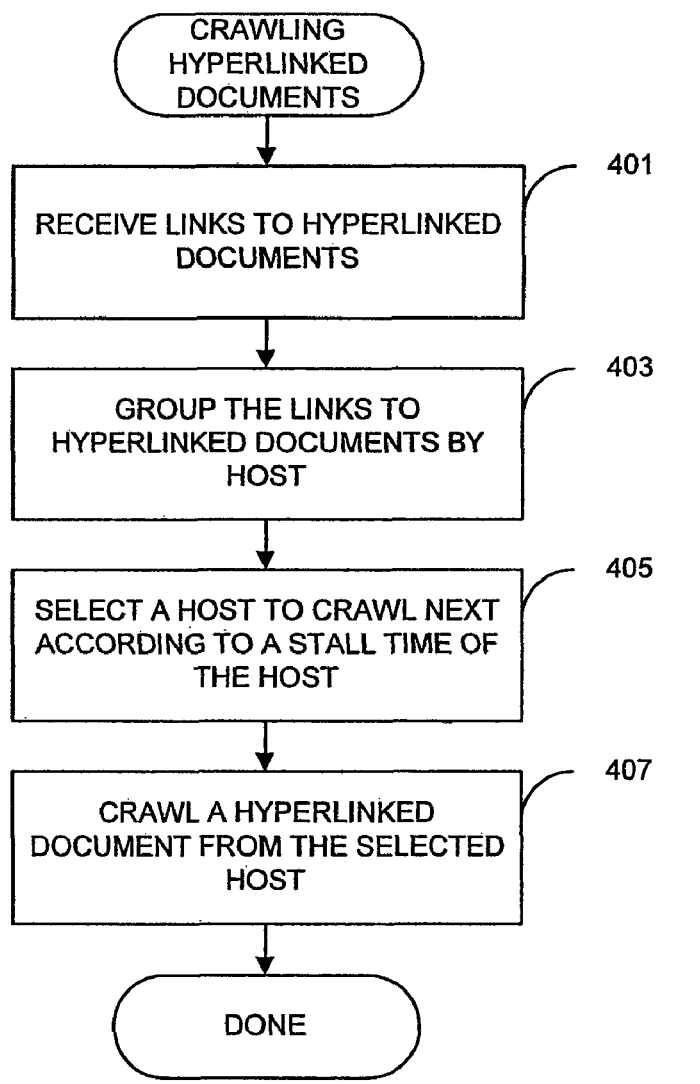
FIG. 6 shows a flow chart of a process of crawling hyperlinked documents that includes selecting the host to crawl next according to a stall time of the host.

Now that an embodiment of the crawling system has been described, a process of crawling hyperlinked documents will be described in reference to FIG. 6. At a step 401, links to hyperlinked documents are received. The links are to hyperlinked documents that are to be crawled. The links to hyperlinked documents are grouped by host at a step 403.

At a step 405, a host to crawl next is selected according to a stall time of the host. The stall time can indicate the earliest time that the host should be crawled. Once the host to be crawled next is selected, a hyperlinked document from the selected host is crawled at a step 407.

By utilizing stall times, embodiments of the invention can ensure that hosts are not crawled too quickly. The stall times can be a predetermined amount of time, vary according to host and vary according to the actual response time of the host.

Figure 7:
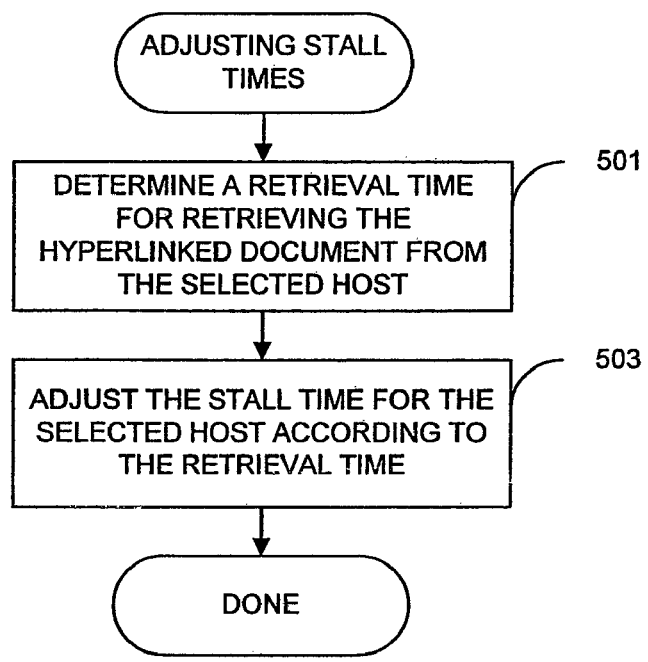
FIG. 7 shows a flow chart of a process of adjusting stall times for hosts according to retrieval times.

FIG. 7 shows a flow chart of a process of adjusting stall times according to the actual retrieval times from the host.

At a step 501, a retrieval time for retrieving the hyperlinked document from the selected host is determined. A timer or any other time measuring mechanism can be utilized to measure how long it takes to retrieve the hyperlinked document from the selected host. Once the actual retrieval time is determined, the stall time for the selected host can be adjusted according to the retrieval time at a step 503. For example, if a host has a load factor of 0.1 and the retrieval time changes from 3 seconds to 7 seconds, the stall time may be 70 seconds after the current time. By adjusting stall times according to actual retrieval times, the crawling system can adapt to the actual traffic that the host is receiving. In some embodiments, default load factors and retrieval times are used (except for known high throughput hosts), but either or both can be adjusted to better suit the particular host at the time.

Figure 8:
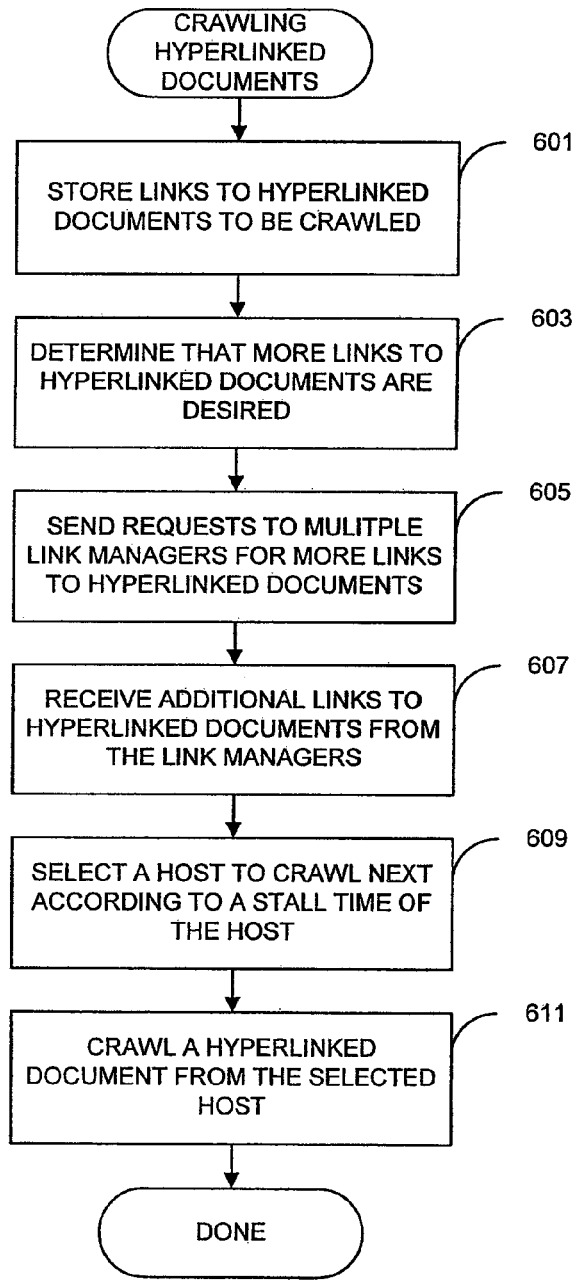
FIG. 8 shows a flow chart of a process of crawling hyperlinked documents where links to be crawled are received from multiple link managers.

FIG. 8 shows a flow chart of crawling hyperlinked documents where a single link server is in communication with multiple link managers. At a step 601, the link manager stores links to hyperlinked documents to be crawled. When it is determined more links to hyperlinked documents are desired at a step 603, the link server sends requests to multiple link managers for more links to hyperlinked documents at a step 605.

At a step 607, the link server receives additional links to hyperlinked documents from the link managers. The link server than selects a host to crawl next according to a stall time of the host at a step 609. At a step 611, a hyperlinked document from the selected host is crawled, such as by a crawler. By utilizing one link server and multiple link managers, the link server has a global view of the crawling process.

While the above is a complete description of preferred embodiments of the invention, various alternatives, modifications, and equivalents can be used. It should be evident that the invention is equally applicable by making appropriate modifications to the embodiments described above. Therefore, the above description should not be taken as limiting the scope of the invention that is defined by the metes and bounds of the appended claims along with their full scope of equivalents.

What is claimed is:

1. A computer-implemented method comprising:
receiving, by one or more processors, a plurality of links to hyperlinked documents to be crawled;
grouping, by one or more processors, the plurality of links to hyperlinked documents by host, each of the plurality of links being associated with one of a plurality of hosts;
grouping, by one or more processors, hosts into buckets, by storing host identifiers, associated with the plurality of hosts, in the buckets, according to a number of links to hyperlinked documents to be crawled at each host;
sorting, by one or more processors, the hosts in each bucket based on a stall time of each host, the stall time of each host indicating an earliest time that each host should be crawled;
crawling, by one or more processors, a link to a first hyperlinked document from a host in a bucket based on a stall time associated with the host;
determining, by one or more processors, a time to obtain the first hyperlinked document from the host;
adjusting, by one or more processors, the stall time based on the determined time to obtain the first hyperlinked document from the host, a load factor associated with the host, and a current time;
moving, by one or more processors, the host from the bucket to another bucket that includes hosts with fewer links to hyperlinked documents to be crawled; and
crawling, by one or more processors, a link to a second hyperlinked document based on the adjusted stall time.

2. The computer-implemented method of claim 1, where the adjusted stall time is determined by dividing an estimated time to retrieve a hyperlinked document from the host by the load factor associated with the host to obtain a value and adding the value to the current time.

3. The computer-implemented method of claim 1, where the adjusted stall time is determined by dividing an actual time to retrieve a hyperlinked document from the host by the load factor associated with the host to obtain a value and adding the value to the current time.

4. The computer-implemented method of claim 1, further comprising:
re-performing the crawling link to a first hyperlinked document, the determining a time to obtain the first hyperlinked document, the adjusting the stall time, and the crawling a link to a second hyperlinked document for a least one other host.

5. The computer-implemented method of claim 1, further comprising:
storing at least one statistic related to the crawling of the link to the first hyperlinked document and the link to the second hyperlinked document from the host.

6. A system comprising:
a plurality of link managers, at least partially implemented in hardware, to:
receive links to hyperlinked documents to be crawled, and
provide the links to the hyperlinked documents in response to requests; and
a link server, at least partially implemented in hardware, to:
send the requests for links to the hyperlinked documents to the plurality of link managers, receive the links to the hyperlinked documents from the plurality of link managers, group the links to the hyperlinked documents by host, each of the links to the hyperlinked documents being associated with one of a plurality of hosts, group the plurality of hosts into buckets, by storing host identifiers, associated with the plurality of hosts, in the buckets according to a number of links to hyperlinked documents to be crawled at each host, sort the hosts in each bucket based on a stall time of each associated host, the stall time of each host indicating an earliest time that each host should be crawled, select a host from one of the buckets to crawl next according to the stall time of the host, and crawl a hyperlinked document from the selected host using a link to the hyperlinked document.

7. The system of claim 6, where at least one link manager of the plurality of link managers is configured to:

verify, for at least one link to a hyperlinked document of the hyperlinked documents, that the at least one link does not match a link pattern in a bad links file.

8. The system of claim 6, where, when selecting the host, the link server is configured to:

examine the buckets in descending order of the number of hyperlinked documents to be crawled at each host until a host is found with a stall time that is earlier than a current time.

9. The system of claim 6, where the link server is further configured to:

reset, after crawling the hyperlinked document from the selected host, the stall time of the selected host, and move the selected host from the one bucket to another bucket that includes hosts with fewer hyperlinked documents to be crawled.

10. The system of claim 9, where, when moving the selected host, the link server is further configured to:

place the selected host in a location of the other bucket based on the reset stall time.

11. The system of claim 6, where the link server is further configured to:

adjust, after crawling the hyperlinked document from the selected host, the stall time of the selected host, and move the selected host from the one bucket to another bucket that includes hosts with fewer hyperlinked documents to be crawled.

12. The system of claim 11, where, when moving the selected host, the link server is further configured to:

place the selected host in a location of the other bucket based on the adjusted stall time.

13. A non-transitory computer-readable medium including instructions for execution by one or more processors, the instructions comprising:

one or more instructions that, when executed by the one or more processors, cause that one or more processors to:

receive a plurality of links to hyperlinked documents to be crawled;

group the plurality of links to hyperlinked documents by host, each of the plurality of links being associated with one of a plurality of hosts;

group hosts into buckets, by storing host identifiers, associated with the plurality of hosts, in the buckets, according to a number of links to hyperlinked documents to be crawled at each host;

sort the hosts in each bucket based on a stall time of each host, the stall time of each host indicating an earliest time that each host should be crawled;

crawl a link to a first hyperlinked document from a host in a bucket based on a stall time associated with the host;

determine a time to obtain the first hyperlinked document from the host;

adjust the stall time based on the determined time to obtain the first hyperlinked document from the host, a load factor associated with the host, and a current time;

move the host from the bucket to another bucket that includes hosts with fewer links to hyperlinked documents to be crawled; and crawl a link to a second hyperlinked document based on the adjusted stall time.

14. The non-transitory computer-readable medium of claim 12, where the one or more instructions to cause the processor to adjust the stall time include:

one or more instructions that, when executed by the one or more processors, cause that one or more processors to adjust the stall time by dividing an estimated time to retrieve a hyperlinked document from the host by the load factor associated with the host to obtain a value and adding the value to the current time.

15. The non-transitory computer-readable medium of claim 12, where the one or more instructions to cause the processor to adjust the stall time include:

one or more instructions that, when executed by the one or more processors, cause that one or more processors to adjust the stall time by dividing an actual time to retrieve a hyperlinked document from the host by the load factor associated with the host to obtain a value and adding the value to the current time.

16. The non-transitory computer-readable medium of claim 12, the instructions further comprising:

one or more instructions that, when executed by the one or more processors, cause that one or more processors to re-perform the crawling link to a first hyperlinked document, the determining a time to obtain the first hyperlinked document, the adjusting the stall time, and the crawling a link to a second hyperlinked document for a least one other host.

17. The non-transitory computer-readable medium of claim 12, the instructions further comprising:

one or more instructions that, when executed by the one or more processors, cause that one or more processors to store at least one statistic related to the crawling of the link to the first hyperlinked document and the link to the second hyperlinked document from the host.

\* \* \* \* \*